United States Patent
Senoue et al.

(10) Patent No.: US 8,248,555 B2
(45) Date of Patent: Aug. 21, 2012

(54) DISPLAY APPARATUS COMPRISES THREE POLARIZERS AND A POLARIZATION CONTROL ELEMENT WHOSE ORIENTATION OF A TRANSMISSION AXIS CHANGES ACCORDING TO A CONTROL SIGNAL

(75) Inventors: Masaharu Senoue, Fukushima (JP); Kentaro Okuyama, Miyagi (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 12/506,654

(22) Filed: Jul. 21, 2009

(65) Prior Publication Data
US 2010/0020265 A1 Jan. 28, 2010

(30) Foreign Application Priority Data
Jul. 24, 2008 (JP) ................. 2008-190528

(51) Int. Cl.
*G02F 1/1335* (2006.01)
*G02F 1/1347* (2006.01)
(52) U.S. Cl. ................. 349/62; 349/63; 349/65; 349/74; 349/96
(58) Field of Classification Search ............... 349/62–65, 349/74, 96–99
See application file for complete search history.

(56) References Cited

U.S. PATENT DOCUMENTS

| | | | |
|---|---|---|---|
| 5,550,656 A | * | 8/1996 | Sprague et al. .................... 349/5 |
| 7,561,332 B2 | * | 7/2009 | Little et al. ................ 359/485.05 |
| 2008/0007514 A1 | | 1/2008 | Tanaka |
| 2008/0303975 A1 | * | 12/2008 | Mizuno et al. .................. 349/62 |

FOREIGN PATENT DOCUMENTS

| | | |
|---|---|---|
| JP | 03-055592 | 3/1991 |
| JP | 03-113427 | 5/1991 |
| JP | 2008-015289 | 1/2008 |
| JP | 2008-051912 | 3/2008 |

* cited by examiner

*Primary Examiner* — Huyen Ngo
(74) *Attorney, Agent, or Firm* — K&L Gates LLP

(57) ABSTRACT

The present application provides a display apparatus including: a display panel having a plurality of pixels disposed in a matrix; a first polarizer; a second polarizer; a surface emitting light source; a third polarizer; and a polarization control element whose orientation of a transmission axis changes according to a control signal. A control section outputs a control signal that controls orientation of the transmission axis of the polarization control element so that a polarization axis of transmission light of the polarization control element is oriented in a direction crossing the transmission axis of the first polarizer in a part corresponding to a pixel position of black display and is oriented in a direction parallel to the transmission axis of the first polarizer in a part corresponding to a pixel position of white display.

11 Claims, 11 Drawing Sheets

FIG. 6A

| | LIQUID CRYSTAL DISPLAY PANEL 10 | POLARIZATION CONTROL ELEMENT 36 |
|---|---|---|
| WHITE DISPLAY | ON | OFF |
| BLACK DISPLAY | OFF | ON |

FIG. 6B

| | LIQUID CRYSTAL DISPLAY PANEL 10 | POLARIZATION CONTROL ELEMENT 36 |
|---|---|---|
| WHITE DISPLAY | ON | ON |
| BLACK DISPLAY | OFF | OFF |

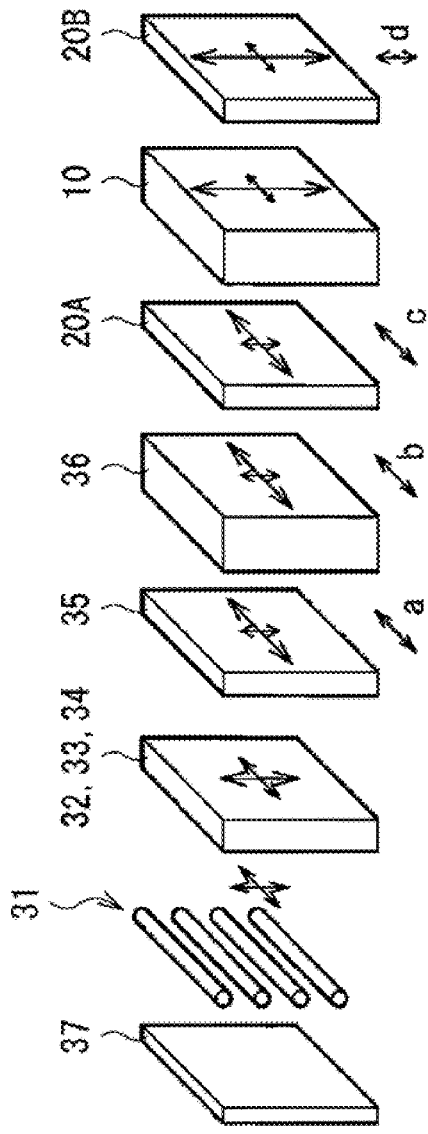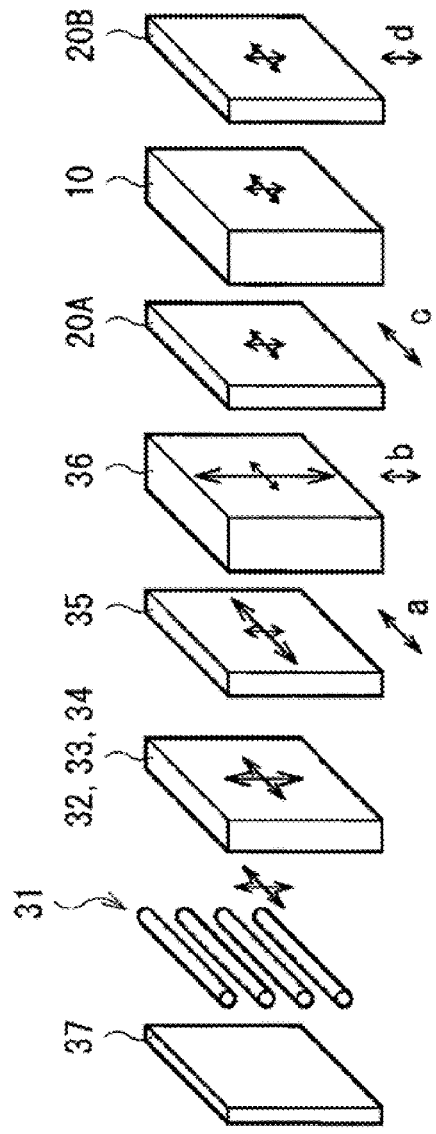
FIG. 7A WHITE DISPLAY
FIG. 7B BLACK DISPLAY

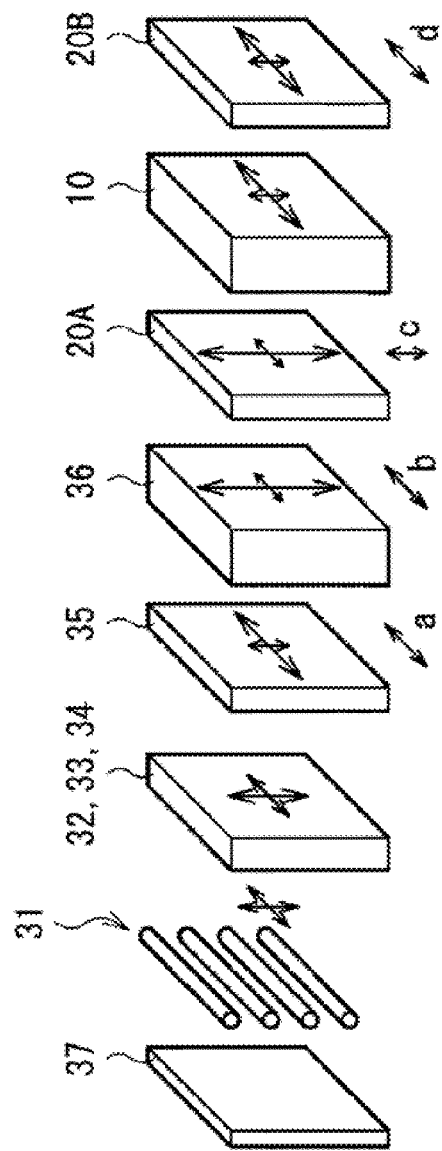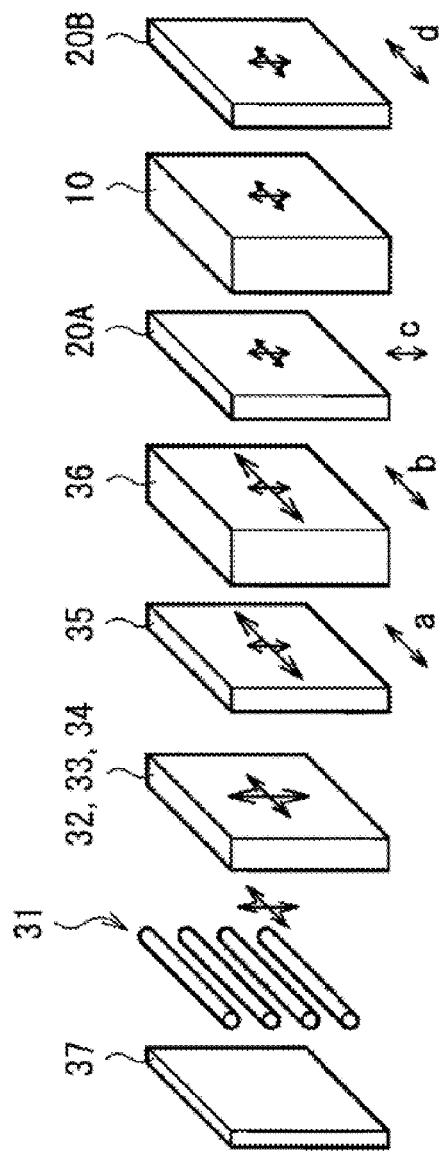
FIG. 8A WHITE DISPLAY
FIG. 8B BLACK DISPLAY

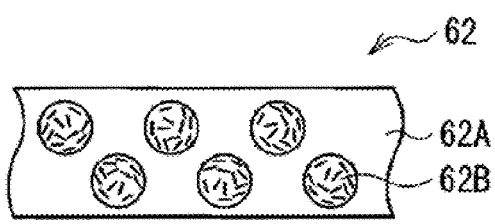
FIG. 11A
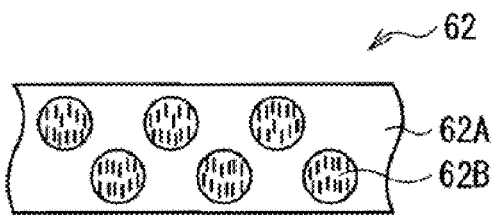
FIG. 11B
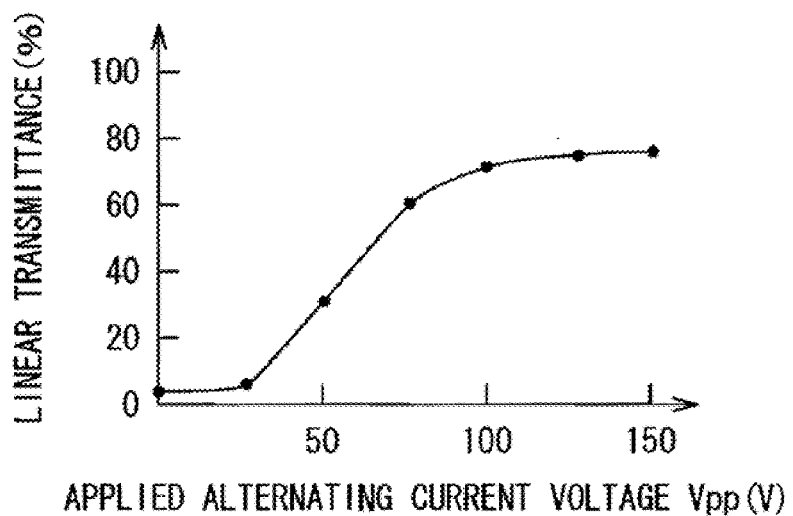
FIG. 12
| | LIQUID CRYSTAL DISPLAY PANEL 10 | POLARIZATION CONTROL ELEMENT 61 |
|---|---|---|
| WHITE DISPLAY | ON | ON |
| BLACK DISPLAY | OFF | OFF |
FIG. 13

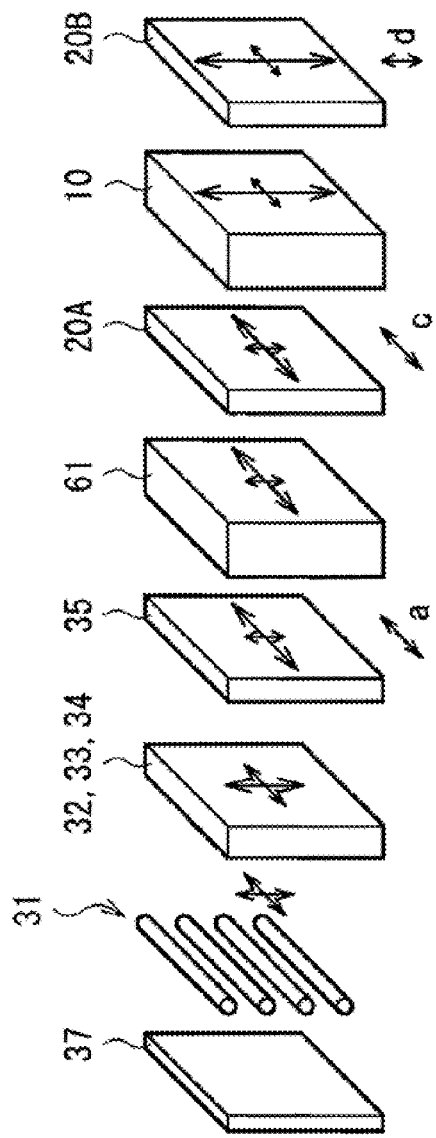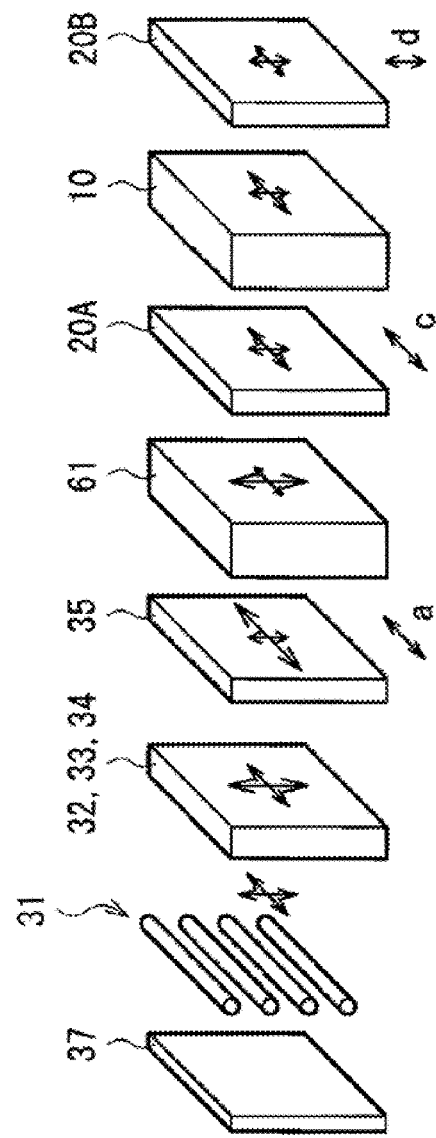
FIG. 14A WHITE DISPLAY
FIG. 14B BLACK DISPLAY

| | CONTRAST | MAXIMUM BRIGHTNESS (cd/m²) |
|---|---|---|
| EXAMPLE 1 | 5325 | 565 |
| EXAMPLE 2 | 3100 | 525 |
| COMPARATIVE EXAMPLE 1 | 1540 | 580 |
| COMPARATIVE EXAMPLE 2 | 11000 | 310 |

DISPLAY APPARATUS COMPRISES THREE POLARIZERS AND A POLARIZATION CONTROL ELEMENT WHOSE ORIENTATION OF A TRANSMISSION AXIS CHANGES ACCORDING TO A CONTROL SIGNAL

CROSS REFERENCES TO RELATED APPLICATIONS

The present application claims priority to that disclosed in Japanese Priority Patent Application JP 2008-190528 filed in the Japan Patent Office on Jul. 24, 2008, the entire content of which is hereby incorporated by reference.

BACKGROUND

The present application relates to a display apparatus having a polarization control element capable of performing polarization control using a control signal, between a light source and a display panel.

Conventionally, a liquid crystal display apparatus is used as a display apparatus of a personal computer, a television, a cellular phone, or the like. Generally, a liquid crystal display apparatus has a structure in which a liquid crystal display panel obtained by sandwiching a liquid crystal cell by a pair of transparent electrodes is sandwiched by a pair of polarizers whose transmission axes are orthogonal to each other. By changing the angles of liquid crystal molecules in the liquid crystal cells and adjusting the light amount of a backlight, an image is displayed.

In a liquid crystal display apparatus, it is extremely important to make contrast high in order to increase the commercial value. At present, as each of the polarizers provided on both sides of the liquid crystal display panel, a polarizer having a brightness transmittance of polarized light parallel to the transmission axis, of about 75% to 85%, and a brightness transmittance of polarized light orthogonal to the transmission axis, of about 0.005% or less, is generally used. A high-grade model in which the brightness transmittance is 0.001% or less is in the market. In the case where polarizers having such brightness transmittance are provided on both sides of a liquid crystal display panel, the contrast is ideally equal to brightness transmittance ratio and is supposed to be at least 20,000 to 30,000:1 or higher.

However, in reality, due to the influence of light scattering in liquid crystal cells, scattering of pigment particles in a color filter and the like, and birefringence of a phase difference film, slight depolarization of polarized light incident on the liquid crystal display panel occurs. Consequently, the polarization direction of the polarized light incident on the liquid crystal display panel is disturbed, and the transmittance of entire cells in black display becomes higher than that of two polarizers overlapped so that the transmission axes are orthogonal to each other. As a result, the contrast becomes about 1000:1 to 3000:1 which is a value far from the polarization degree of the polarizers.

As a method of improving contrast, a measure using local turn-on/off of a light source is proposed. In the measure, an output of the light source is adjusted according to lightness of a video image, and contrast may be largely improved as compared with a method of increasing the polarization degree of the polarizers or reducing depolarization of the liquid crystal cells. In particular, in the case of a device in which a number of LEDs are arranged just below a liquid crystal display panel is used as a backlight, since partial light-on or light-off is easily performed and response is high, the contrast may be easily improved by using the method.

However, the method may not be used in the case where the light source is a cold cathode tube or is of an edge light type using a light guide plate. In the former case, on/off control may not be performed in a direction parallel to the extension direction of the cold cathode tube, and response is lower than that of an LED at light emission speed of a general phosphor. In the latter case, the light source may not be locally turned on because of the structure. Consequently, the light sources of those types are also requested to largely improve the contrast.

As methods of improving contrast regardless of the type of the light source, for example, Japanese Unexamined Patent Application Publication Nos. 2008-51912, 2008-15289, H03-055592, and H03-113427 disclose techniques preparing another display apparatus in which a liquid crystal display panel is sandwiched by a pair of polarizers whose transmission axes are orthogonal to each other and using the apparatus as an apparatus for an optical shutter.

SUMMARY

However, the above-described method has a problem. Since the polarizers are disposed on both sides of a liquid crystal display panel for an optical shutter, brightness in black display may be suppressed only by the amount of the two polarizers, but brightness in white display also largely decreases.

It is therefore desirable to provide a display apparatus realizing improved contrast while suppressing decrease in brightness in white display.

A first display apparatus in an embodiment includes a display panel having a plurality of pixels disposed in a matrix. The plurality of pixels are driven on the basis of an image signal. A first polarizer is provided on one of faces of the display panel, and a second polarizer is provided on the other face of the display panel. The display apparatus has a surface emitting light source illuminating the display panel from the first polarizer side. A third polarizer and a polarization control element whose orientation of a transmission axis changes according to a control signal are provided in order from the first polarizer side, between the first polarizer and the surface emitting light source. The display apparatus further includes a control section outputting a control signal. The control section outputs a control signal that controls orientation of the transmission axis of the polarization control element so that a polarization axis of transmission light of the polarization control element is oriented in a direction crossing the transmission axis of the first polarizer in a part corresponding to a pixel position of black display and is oriented in a direction parallel to the transmission axis of the first polarizer in a part corresponding to a pixel position of white display.

In the first display apparatus of an embodiment, the polarization axis of transmission light of the polarization control element is oriented in a direction crossing the transmission axis of the first polarizer in a part corresponding to a pixel position of black display and is oriented in a direction parallel to the transmission axis of the first polarizer in a part corresponding to the pixel position of white display. With the arrangement, light passing through the part corresponding to the pixel position of black display in the polarization control element is absorbed by the first polarizer. As compared with the case where light passes through the first polarizer without being absorbed by the first polarizer, the amount of light incident on the pixel position in the black display in the display panel decreases. In the polarization control element, only the orientation of the polarization axis is adjusted when the light passes through the polarization control element, and light absorption hardly occurs. Consequently, light incident on the part corresponding to the pixel position of white display in the polarization control element passes through the polarization control element and the first polarizer almost without being attenuated and enters the pixel position of white display in the display panel.

A second display apparatus in an embodiment has a display panel having a plurality of pixels disposed in a matrix. The plurality of pixels are driven on the basis of an image signal. A first polarizer is provided on one of faces of the display panel, and a second polarizer is provided on the other face of the display panel. The display apparatus is provided with a surface emitting light source illuminating the display panel from the first polarizer side. A third polarizer and a polarization control element that scatters or transmits transmission light of the third polarizer in accordance with a control signal are disposed in order from the first polarizer side, between the first polarizer and the surface emitting light source. The display apparatus further has a control section outputting a control signal. The control section outputs a control signal controlling the polarization control element so as to scatter the transmission light of the third polarizer in a part corresponding to a pixel position of black display and so as to transmit the transmission light in a part corresponding to a pixel position of white display.

In the second display apparatus of an embodiment, the polarization control element scatters the transmission light of the third polarizer in the part corresponding to the pixel position of black display and transmits the transmission light in the part corresponding to the pixel position of white display. With the arrangement, the light scattered in the part corresponding to the pixel position of black display in the polarization control element is absorbed by the first polarizer. As compared with the case where light passes through the first polarizer without being absorbed by the first polarizer, the amount of light incident on the pixel position in the black display in the display panel decreases. In the polarization control element, light loss hardly occurs when the light passes through the polarization control element. Consequently, light incident on the part corresponding to the pixel position of white display in the polarization control element passes through the polarization control element and the first polarizer almost without being attenuated and enters the pixel position of white display in the display panel.

In the first display apparatus of an embodiment, the polarization axis of transmission light of the polarization control element is oriented in a direction crossing the transmission axis of the first polarizer in the part corresponding to the pixel position of black display, and is oriented in a direction parallel to the transmission axis of the first polarizer in the part corresponding to the pixel position of white display. Therefore, the amount of light incident on the pixel position of black display in the display panel decreases, and depolarization occurring in the display panel may be reduced. Further, light incident on the part corresponding to the pixel position of white display in the polarization control element passes through the polarization control element and the first polarizer almost without being attenuated and enters the pixel position of white display in the display panel, so that decrease in brightness in white display may be suppressed. Therefore, while suppressing decrease in brightness in white display, contrast may be improved.

In the second display apparatus of an embodiment, the polarization control element scatters the transmission light of the third polarizer in the part corresponding to the pixel position of black display and transmits the transmission light in the part corresponding to the pixel position of white display. Therefore, the amount of light incident on the pixel position of black display in the display panel decreases, and depolarization occurring in the display panel may be reduced. Further, light incident on the part corresponding to the pixel position of white display in the polarization control element passes through the polarization control element and the first polarizer almost without being attenuated and enters the pixel position of white display in the display panel, so that decrease in brightness in white display may be suppressed. Therefore, while suppressing decrease in brightness in white display, contrast may be improved.

Additional features and advantages are described herein, and will be apparent from the following Detailed Description and the figures.

BRIEF DESCRIPTION OF THE FIGURES

FIGS. 6A and 6B are relation diagrams showing an example of the relation between on/off operation of the polarization control element in FIG. 1 and white display and black display of the liquid crystal display panel.

FIGS. 7A and 7B are schematic diagrams for explaining an example of a polarization state in the display apparatus of FIG. 1.

FIGS. 8A and 8B are schematic diagrams for explaining another example of the polarization state in the display apparatus of FIG. 1.

FIGS. 11A and 11B are schematic diagrams for explaining operation in the polarization control element in FIG. 9.

FIG. 12 is a relation diagram showing an example of the relation between applied alternating current voltage and linear transmittance in the polarization control element in FIG. 9.

FIG. 13 is a relation diagram showing an example of the relation between on/off operation of the polarization control element in FIG. 9 and white display and black display of the liquid crystal display panel.

FIGS. 14A and 14B are schematic diagrams for explaining an example of a polarization state in the display apparatus of FIG. 9.

DETAILED DESCRIPTION

The present application will be described in detail hereinbelow with reference to the drawings according to an embodiment.

First Embodiment

Figure 1:
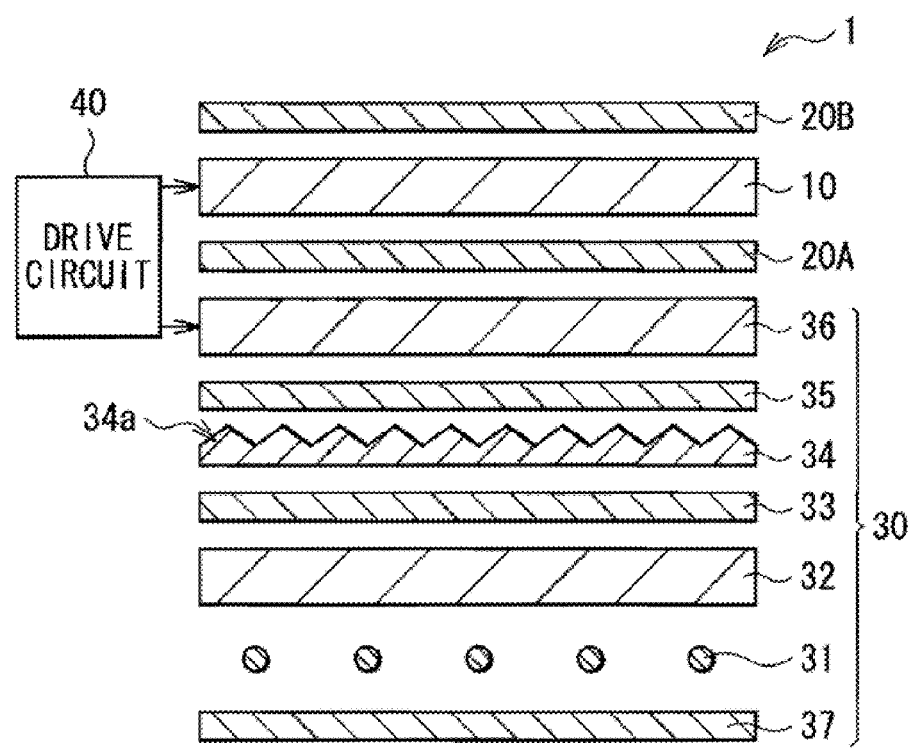
FIG. 1 is a cross section showing an example of the configuration of a display apparatus of a first embodiment.

FIG. 1 shows an example of a general configuration of a display apparatus 1 as a first embodiment. The display apparatus 1 has a liquid crystal display panel 10 (display panel), a polarizer 20A (first polarizer) and a polarizer 20B (second polarizer) sandwiching the liquid crystal display panel 10, an illuminating apparatus 30 disposed on the rear side of the polarizer 20B, and a drive circuit 40 driving the liquid crystal display panel 10 to display a video image. The surface of the polarizer 20A is directed toward an observer (not shown).

Figure 2:
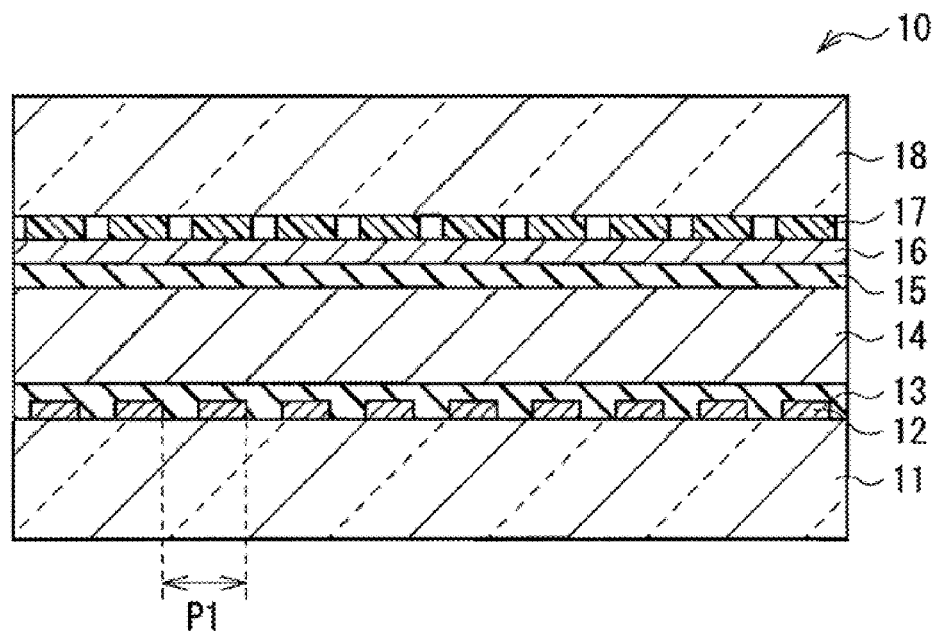
FIG. 2 is a cross section showing an example of the configuration of a liquid crystal display panel in FIG. 1.

The liquid crystal display panel 10 is provided to display a video image. The liquid crystal display panel 10 is, for example, a transmission-type display panel in which pixels are driven according to a video signal, and has a structure in which a liquid crystal layer is sandwiched by a pair of transparent substrates. Concretely, the liquid crystal display panel 10 has, as shown in FIG. 2, in order from the illuminating apparatus 30 side, a transparent substrate 11, a pixel electrode 12, an alignment film 13, a liquid crystal layer 14, an alignment film 15, a common electrode 16, a color filter 17, and a transparent substrate 18.

The transparent substrates 11 and 18 are substrates transparent to visible light such as glass plates. On the transparent substrate 11 on the illuminating apparatus 30 side, although not shown, active drive circuits including a TFT (Thin Film Transistor) and a wire electrically connected to the pixel electrode 12, and the like are formed.

The pixel electrode 12 and the common electrode 16 are made of, for example, ITO (Indium Tin Oxide). The pixel electrodes 12 are lattice-arranged or delta-arranged on the transparent substrate 11 and function as electrodes of respective pixels. On the other hand, the common electrode 16 is formed on one surface of the color filter 17 and functions as a common electrode facing the pixel electrodes 12.

The alignment films 13 and 15 are made of a high-polymer material such as polyimide and perform aligning process on the liquid crystal.

The liquid crystal layer 14 is made of a liquid crystal, for example, in a VA (Vertical Alignment) mode, a TN (Twisted Nematic) mode, or an STN (Super Twisted Nematic) mode and, as will be described later, has the function of changing the orientation of the polarization axis of light emitted from the illuminating apparatus 30 pixel by pixel by an application voltage from the drive circuit 40. By changing the arrangement of the liquid crystal in multiple stages, the orientation of the transmission axis of each pixel is adjusted in multiple stages.

The color filter 17 separates light passed through the liquid crystal layer 14 to, for example, three primary colors of red (R), green (G), and blue (B) or four colors such as R, G, B, and white (W). Patterns of respective colors in the color filter 17 are arranged in correspondence with the arrangement of the pixel electrodes 12. The filter arrangement (pixel arrangement) is, generally, stripe arrangement, diagonal arrangement, delta arrangement, rectangle arrangement, or the like.

The polarizer 20A is a polarizer disposed on the light incidence side of the liquid crystal display panel 10. The polarizer 20B is a polarizer disposed on the light outgoing side of the liquid crystal display panel 10. The polarizers 20A and 20B are a kind of an optical shutter and transmit only light in a predetermined vibration direction (polarization light). The polarizer 20A may be an absorption-type polarization element that absorbs light in a vibration direction (polarization light) other than the transmission axis. From the viewpoint of improving brightness, a reflection-type polarization element that reflects light to the illuminating apparatus 30 side is preferable. The polarizers 20A and 20B are disposed so that their polarization axes are different from each other by 90 degrees. With the arrangement, light emitted from the illuminating apparatus 30 passes via the liquid crystal layer 14 or is interrupted.

The transmission axis of the polarizer 20A is parallel to the transmission axis of a reflection-type polarization element 35 which will be described later or crosses (is orthogonal to) the transmission axis of the reflection-type polarization element 35.

Figure 3:
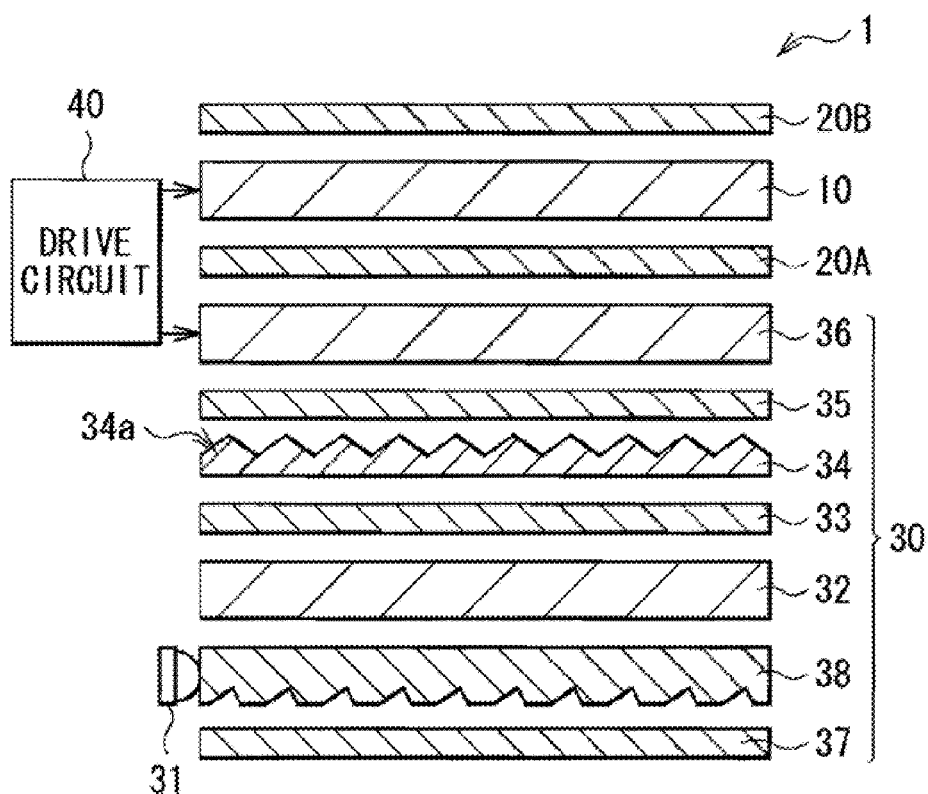
FIG. 3 is a cross section showing another example of the configuration of the display apparatus of FIG. 1.

The illuminating apparatus 30 has a light source 31. In the illuminating apparatus, for example, as shown in FIG. 1, on the liquid crystal display panel 10 side of the light source 31, a diffuser 32, a diffusion sheet 33, a prism sheet 34, the reflection-type polarization element 35 (third polarizer), and a polarization control element 36 are disposed in order from the light source 31 side. On the other hand, on the back side of the light source 31, a reflection sheet 37 is disposed. The illuminating apparatus 30 is, preferably, of a so-called direct backlight type as described above. For example, the illuminating apparatus 30 may be of a side-edge type using a light guide plate 38 as shown in FIG. 3.

The light source 31 and the reflection sheet 37 in FIG. 1 correspond to a concrete example of a "surface-emitting light source" of the present application.

In the light source 31, for example, as shown in FIG. 1, a plurality of linear light sources are arranged in parallel at equal intervals (for example, 20 mm intervals). The linear light source is typically a cold cathode fluorescent lamp (CCFL). Alternatively, point-like light sources such as light emitting diodes (LEDs) or organic EL (Electro Luminescence) elements may be disposed linearly. The light source 31 may be obtained by disposing, for example, the point-like light sources in a lattice shape at equal intervals.

The reflection sheet 37 is obtained by sequentially stacking, for example, aluminum (Al), an expanded polyethylene terephthalate (PET), and polycarbonate from the light source 31 side. The reflection sheet 37 reflects a part of light emitted from the light source 31 toward the liquid crystal display panel 10. With the configuration, light emitted from the light source 31 may be efficiently used.

The diffuser 32 is formed by, for example, diffusing a diffusion material (filler) into a relatively-thick plate-shaped transparent resin. The diffusion sheet 33 is formed by, for example, applying a transparent resin (binder) containing the diffusion material on a relatively-thin film-shaped transparent resin. As the plate-shaped or film-shaped transparent resin, for example, PET, acrylic, polycarbonate, or the like is used. As the diffusion material, for example, an inorganic filler such as $SiO_2$, an organic filler such as acrylic, or the like is used.

The prism sheet 34 is made of, for example, a resin material having translucency. A plane including the prism sheet 34 is disposed so as to be parallel to the surface of the liquid crystal display panel 10. In the face on the light outgoing side (surface) of the prism sheet 34, a plurality of projections 34a are formed. The face on the light incident side (rear face) of the prism sheet 34 is, for example, a mirror surface.

Each of the plurality of projections 34a has a linear or cone stereoscopic shape. In the case where each of the projections 34a has a linear stereoscopic shape and the light source 31 is a linear light source, preferably, the extension direction of the projection 34a is disposed so as to be parallel to the extension direction of the light source 31. In this case, the projections 34a may be disposed so as to cross the extension direction of the light source 31 in a permissible range from the viewpoint of optical characteristics.

The reflection-type polarization element 35 has, for example, a multilayer structure (not shown) in which layers having different refractive indices are stacked. The reflection-type polarization element 35 ps-splits light whose directionality is increased by the prism sheet 34, transmits only a p-wave, and selectively reflects an s-wave. The reflected s-wave is reflected again by the reflection sheet 37 or the like disposed at the back side of the light source 31. At this time, the light is split to the p-wave and the s-wave, so that the s-wave reflected by the reflection-type polarization element 35 may be re-used. The reflection-type polarization element 35 may have a structure obtained by sandwiching the multilayer structure by a pair of diffusion sheets. In this case, the p-wave passed through the multilayer structure is diffused in the diffusion sheet in the reflection-type polarization element 35, so that the view angle is widened.

Figure 4:
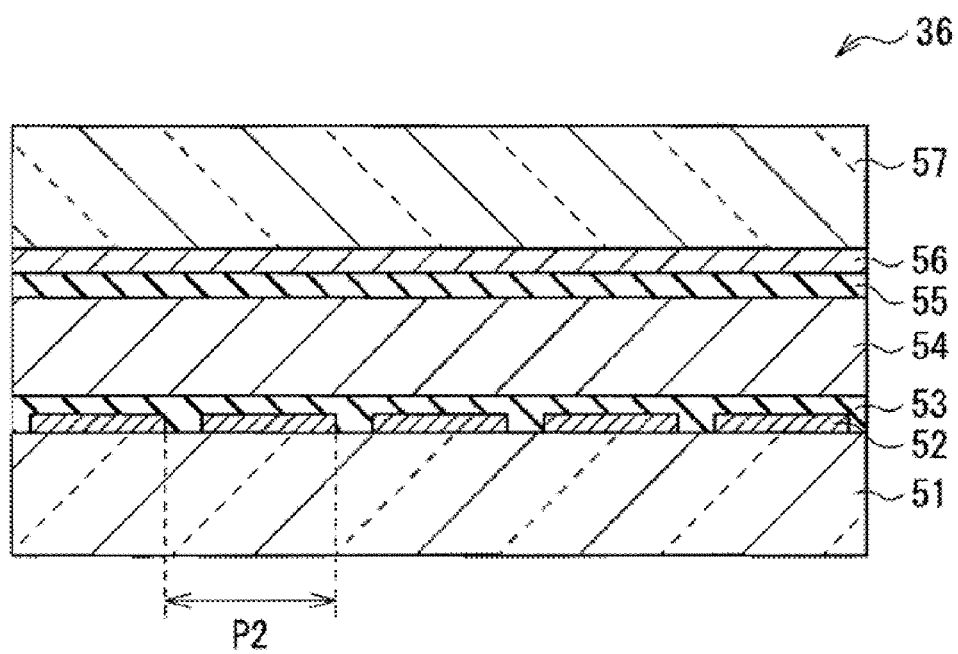
FIG. 4 is a cross section showing an example of the configuration of a polarization control element in FIG. 1.

The polarization control element 36 is provided to suppress black brightness in a black display part included in a video image as much as possible. The polarization control element 36 is, for example, a transmission-type panel in which pixels are driven according to a control signal and has a structure in which a liquid crystal layer is sandwiched by a pair of transparent substrates. Concretely, the polarization control element 36 has, as shown in FIG. 4, in order from the illuminating apparatus 30 side, a transparent substrate 51, an X electrode 52, an alignment film 53, a liquid crystal layer 54, an alignment film 55, a Y electrode 56, and a transparent substrate 57.

The transparent substrates 51 and 57 are substrates transparent to visible light such as glass plates. In the embodiment, on the transparent substrate 51 on the illuminating apparatus 30 side, drive circuits such as a TFT are not formed.

The X electrode 52 and the Y electrode 56 are made of, for example, ITO. The X electrode 52 is formed so as to extend in one direction on the transparent substrate 51. The Y electrode 56 is formed so as to extend in a direction orthogonal to the X electrode 52 on the transparent substrate 57. A part in which the X electrode 52 and the Y electrode 56 face each other functions as an electrode of a pixel. That is, the polarization control element 36 is a panel of a simple matrix drive type.

A pixel pitch P2 of the polarization control element 36 is equal to or larger than a pixel pitch P1 of the liquid crystal display panel 10. The pixel of the polarization control element 36 is disposed for one or more pixels in the liquid crystal display panel 10. Usually, the brightness difference between neighboring pixels in the liquid crystal display panel 10 is little. Consequently, even when the pixel pitch P2 of the polarization control element 36 is slightly wider than the pixel pitch P1 of the liquid crystal display panel 10, there may be no problem in display of a video image. Usually, when the brightness of the black display part in a video image has to be suppressed as much as possible, the black display part occupying the video image is wide. Therefore, even when the pixel pitch P2 of the polarization control element 36 is much wider than the pixel pitch P1 of the liquid crystal display panel 10, in the case where the black display part occupying the video image is wide, there may be no problem in display of a video image.

The alignment films 53 and 55 are made of a high-polymer material such as polyimide and perform aligning process on the liquid crystal.

The liquid crystal layer 54 is made of an oriented liquid crystal, for example, in a TN mode, a VA mode, an IPS mode, or the like and, as will be described later, has the function of changing the orientation of the polarization axis of light passed through the reflection-type polarization element 35 pixel by pixel by an application voltage from the drive circuit 40. By changing the arrangement of the liquid crystal in two stages or multiple stages, the liquid crystal layer 54 may adjust the orientation of the transmission axis of each pixel in two stages or multiple stages. Since the influence such as wavelength dispersion when the polarization plane is turned may be reduced, it is preferable to use the oriented liquid crystal in the TN mode for the liquid crystal layer 54. As necessary, a phase difference compensation layer for suppressing coloring in an oblique direction may be provided in contact with the face on the light outgoing side of the liquid crystal layer 54.

The transmission axis of the polarization control element 36 (the polarization axis of transmission light of the polarization control element 36) is oriented in a direction parallel to the transmission axis of the polarizer 20A or oriented in a direction crossing (orthogonal to) the transmission axis of the polarizer 20A, in accordance with a control signal from the drive circuit 40 (after-mentioned drive voltage 46a).

For example, in the case where the transmission axis of the polarizer 20A is parallel to the transmission axis of the reflection-type polarization element 35, when the control signal is off (for example, when a drive voltage 46a is zero volt), the transmission axis of the polarization control element 36 is parallel to the transmission axis of the polarizer 20A. When the control signal is turned on (for example, when the drive voltage 46a becomes a value at which the polarization axis of light incident on the polarization control element 36 is turned by 90°), the transmission axis of the polarization control element 36 turns and crosses (becomes orthogonal to) the transmission axis of the polarizer 20A.

For example, in the case where the transmission axis of the polarizer 20A crosses (is orthogonal to) the transmission axis of the reflection-type polarization element 35, when the control signal is off, the polarization axis of transmission light of the polarization control element 36 crosses (is orthogonal to) the transmission axis of the polarizer 20A. When the control signal is turned on, the transmission axis of the polarization control element 36 turns and becomes parallel to the transmission axis of the polarizer 20A.

Figure 5:
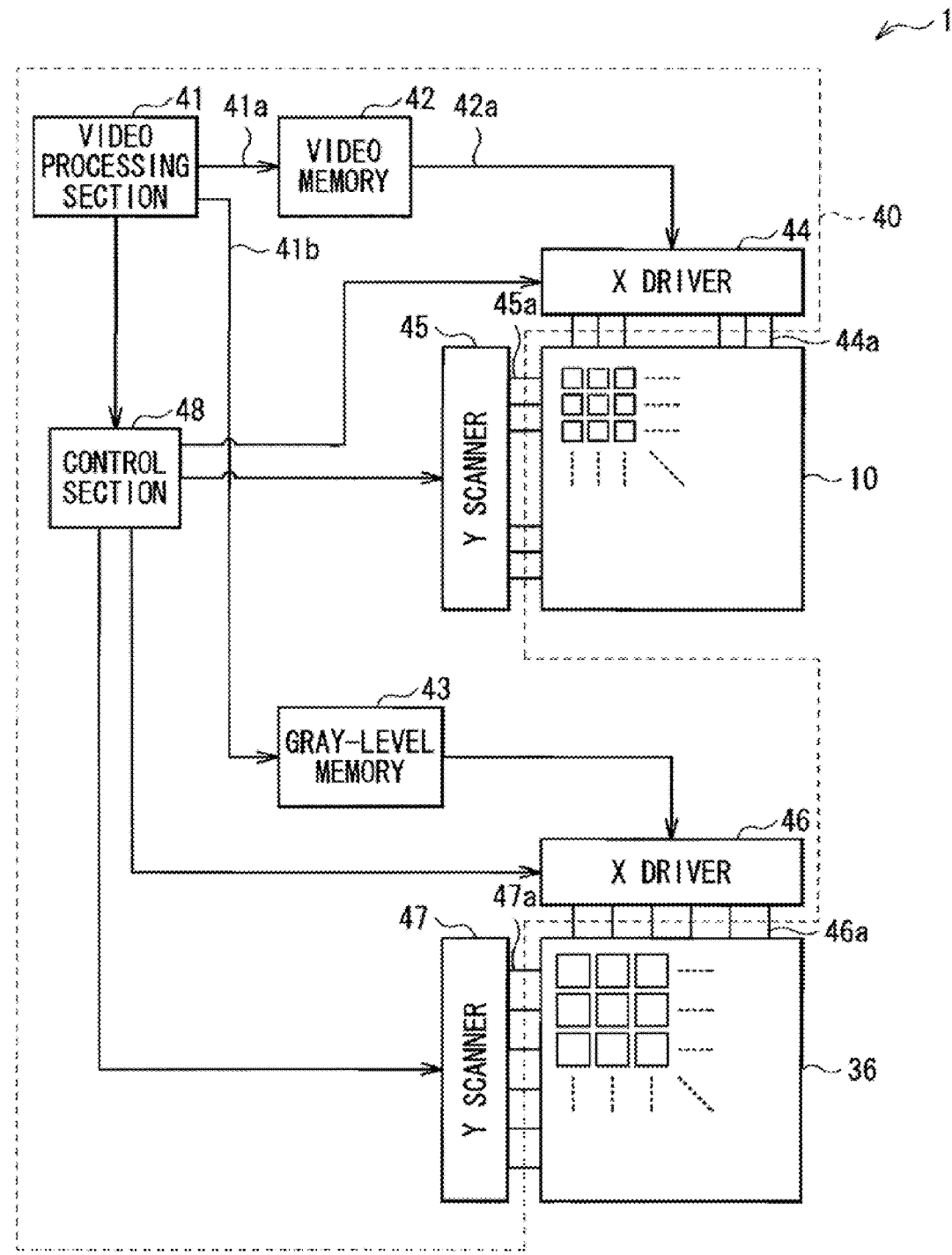
FIG. 5 is a schematic diagram showing the configuration of a drive circuit in FIG. 1 on a function block unit basis.

FIG. 5 shows functional blocks of the drive circuit 40. The drive circuit 40 includes: a video processing section 41 processing a video signal from the outside to generate an RGB signal 41a and generating a gray level signal 41b obtained by converting the RGB signal to a binary signal or a multi-value signal; a video memory 42 as a frame memory storing the RGB signal 41a from the video processing section 41; a gray-level memory 43 as a frame memory for storing the gray level signal 41b from the video processing section 41; an X driver 44 supplying a drive voltage 44a based on RGB signals 42a of one line to the pixel electrodes 12 in the liquid crystal display panel 10; a Y scanner 45 sequentially scanning scan lines (not shown) in the liquid crystal display panel 10; an X driver 46 sequentially supplying the drive voltage 46a based on the gray level signals 41b of pixels to the X electrode 52 in the polarization control element 36; a Y scanner 47 sequentially scanning the Y electrodes 56 in the polarization control element 36; and a control section 48 controlling the X driver 44, the Y driver 45, the X driver 46, and the Y scanner 47.

A binarizing process in the video processing section 41 refers to, for example, a process of setting a signal corresponding to an intermediate gray level and a high gray level (white display) in the RGB signals 41a to "1" and setting a low gray level (black display) in the RGB signals 41a to "0". The multi-level process in the video processing section 41 refers to, for example, a process of assigning a positive number according to the brightness level of the RGB signal 41a to the RGB signal 41a.

The X driver 46 performs a control of bringing the transmission axis of the polarization control element 36 (the polarization axis of transmission light of the polarization control element 36) to a direction parallel to the transmission axis of the polarizer 20A and to a direction crossing (orthogonal to) the transmission axis of the polarizer 20A.

For example, in the case where the transmission axis of the polarizer 20A is parallel to the transmission axis of the reflection-type polarization element 35 and, when the control signal is off, the transmission axis of the polarization control element 36 is parallel to the transmission axis of the polarizer 20A, the X driver 46 does not output a control signal (drive voltage 46a) to a pixel corresponding to a pixel position of the intermediate gray level and the high gray level (white display) in the liquid crystal display panel 10. That is, the X driver 46 outputs zero volt. At this time, the X driver 46 outputs a control signal (drive voltage 46a) to a pixel corresponding to a pixel position of the low gray level (black display) in the liquid crystal display panel 10. That is, the X driver 46 outputs a voltage of a value at which the polarization axis of light incident on the polarization control element 36 is turned by 90°. FIG. 6A shows the relations between the on/off operation of the polarization control element 36 and the white display and black display in the liquid crystal display panel 10 in this case.

For example, in the case where the transmission axis of the polarizer 20A is parallel to the transmission axis of the reflection-type polarization element 35 and, when the control signal is off, the transmission axis of the polarization control element 36 crosses (is orthogonal to) the transmission axis of the polarizer 20A, the X driver 46 outputs a control signal (drive voltage 46a) to a pixel corresponding to a pixel position of the intermediate gray level and the high gray level (white display) in the liquid crystal display panel 10. That is, the X driver 46 outputs a voltage of a value at which the polarization axis of light incident on the polarization control element 36 is turned by 90°. At this time, the X driver 46 does not output a control signal (drive voltage 46a) to a pixel corresponding to a pixel position of the low gray level (black display) in the liquid crystal display panel 10. That is, the X driver 46 outputs zero volt. FIG. 6B shows the relations between the on/off operation of the polarization control element 36 and the white display and black display in the liquid crystal display panel 10 in this case.

For example, in the case where the transmission axis of the polarizer 20A crosses (is orthogonal to) the transmission axis of the reflection-type polarization element 35 and, when the control signal is off, the transmission axis of the polarization control element 36 is parallel to the transmission axis of the polarizer 20A, the X driver 46 does not output a control signal (drive voltage 46a) to a pixel corresponding to a pixel position of the intermediate gray level and the high gray level (white display) in the liquid crystal display panel 10. That is, the X driver 46 outputs zero volt. At this time, the X driver 46 outputs a control signal (drive voltage 46a) to a pixel corresponding to a pixel position of the low gray level (black display) in the liquid crystal display panel 10. That is, the X driver 46 outputs a voltage of a value at which the polarization axis of light incident on the polarization control element 36 is turned by 90°. FIG. 6A shows the relations between the on/off operation of the polarization control element 36 and the white display and black display in the liquid crystal display panel 10 in this case.

For example, in the case where the transmission axis of the polarizer 20A crosses (is orthogonal to) the transmission axis of the reflection-type polarization element 35 and, when the control signal is off, the transmission axis of the polarization control element 36 crosses (is orthogonal to) the transmission axis of the polarizer 20A, the X driver 46 outputs a control signal (drive voltage 46a) to a pixel corresponding to a pixel position of the intermediate gray level and the high gray level (white display) in the liquid crystal display panel 10. That is, the X driver 46 outputs a voltage of a value at which the polarization axis of light incident on the polarization control element 36 is turned by 90°. At this time, the X driver 46 does not output a control signal (drive voltage 46a) to a pixel corresponding to a pixel position of the low gray level (black display) in the liquid crystal display panel 10. That is, the X driver 46 outputs zero volt. FIG. 6B shows the relations between the on/off operation of the polarization control element 36 and the white display and black display in the liquid crystal display panel 10 in this case.

The action and effect of the display apparatus 1 of the embodiment will now be described with reference to FIGS. 7A and 7B and FIGS. 8A and 8B. FIGS. 7A and 7B and FIGS. 8A and 8B schematically show an example of the polarization state in the display apparatus 1.

Not-polarized light emitted from the light source 31 and passed through the diffuser 32, the diffusion sheet 33, and the prism sheet 34 is incident on the rear face of the reflection-type polarization element 35. A polarization component parallel to the transmission axis "a" of the reflection-type polarization element 35 in the light incident on the rear face of the reflection-type polarization element 35 passes through the reflection-type polarization element 35 and is incident on the rear face of the polarization control element 36. On the other hand, a polarization component crossing the transmission axis "a" of the reflection-type polarization element 35 in the light incident on the rear face of the reflection-type polarization element 35 is reflected by the reflection-type polarization element 35. The reflection light is reflected by the surface of the diffuser 32, the diffusion sheet 33, and the prism sheet 34, or the reflection sheet 37, and becomes non-polarized light. The non-polarized light enters again the reflection-type polarization element 35. By repeating such recycle, the light extraction efficiency is increased, and front face brightness improves.

The polarization axis of polarized light incident on the rear side of the polarization control element 36 is controlled by the polarization control element 36 to a direction crossing (orthogonal to) the transmission axis of the polarizer 20A in a part corresponding to the pixel position of low gray level (black display) in the liquid crystal display panel 10, and is controlled to a direction parallel to the transmission axis of the polarizer 20A in a part corresponding to the pixel position of intermediate gray level and high gray level (white display) in the liquid crystal display panel 11.

For example, as shown in FIGS. 7A and 7B, in the case where the transmission axis "c" of the polarizer 20A is parallel to the transmission axis "a" of the reflection-type polarization element 35, in a part corresponding to the pixel position of white display, as shown in FIG. 7A, the transmission axis "b" of the polarization control element 36 is controlled by a control signal (drive voltage 46a) so that the transmission axis "b" of the polarization control element 36 becomes parallel to the transmission axis "c" of the polarizer 20A. In a part corresponding to the pixel position of black display, as shown in FIG. 7B, the transmission axis "b" of the polarization control element 36 is controlled by a control signal (drive voltage 46a) so that the transmission axis "b" of the polarization control element 36 crosses (becomes orthogonal to) the transmission axis "c" of the polarizer 20A.

For example, as shown in FIGS. 8A and 8B, in the case where the transmission axis "c" of the polarizer 20A crosses (is orthogonal to) the transmission axis "a" of the reflection-type polarization element 35, in a part corresponding to the pixel position of white display, as shown in FIG. 8A, the transmission axis "b" of the polarization control element 36 is controlled by a control signal (drive voltage 46a) so that the transmission axis "b" of the polarization control element 36 crosses (becomes orthogonal to) the transmission axis "c" of the polarizer 20A. In a part corresponding to the pixel position of black display, as shown in FIG. 8B, the transmission axis "b" of the polarization control element 36 is controlled by a control signal (drive voltage 46a) so that the transmission axis "b" of the polarization control element 36 becomes parallel to the transmission axis "c" of the polarizer 20A.

The polarized light passed through the polarization control element 36 enters the polarizer 20A. The polarization component crossing the transmission axis "c" of the polarizer 20A in the light incident on the polarizer 20A is absorbed or reflected by the polarizer 20A, and the polarization component parallel to the transmission axis "c" passes through the polarizer 20A. The light passed through the polarizer 20A is subjected to polarization control in accordance with the magnitude of the applied voltage on the pixel unit basis in the liquid crystal display panel 10. The resultant light is color separated by the color filter 17 (refer to FIG. 2) and the resultant light is incident on the polarizer 20B. Only a polarization component parallel to the transmission axis "d" of the polarizer 20B passes through the polarizer 20B to form an image on the front face of the panel. In such a manner, an image is displayed in the display apparatus 1.

In related art, incident polarized light passes through the liquid crystal display panel and is absorbed by the polarizer on the outgoing side. Since the polarized light having very high intensity passes through the liquid crystal display panel, the polarization plane is disturbed by depolarization. The amount of light which is not absorbed by the polarizer on the outgoing side but leaks is large, and it is difficult to reduce brightness in the black display.

On the other hand, in the embodiment, the polarization control element 36 is provided on the rear side of the polarizer 20A, and the transmission axis "b" of the polarization control element 36 is set to the direction crossing (orthogonal to) the transmission axis "c" of the polarizer 20A in a part corresponding to the pixel position of the low gray level (black display) in the liquid crystal display panel 10 in accordance with the control signal (drive voltage 46a) from the drive circuit 40. With the arrangement, light passed through the part corresponding to the pixel position of black display in the polarization control element 36 is absorbed or reflected by the polarizer 20A disposed on the back side of the liquid crystal display panel 10, before entering the liquid crystal display panel 10. As a result, light itself in which the polarization plane is disturbed by depolarization in the liquid crystal display panel 10 may be reduced, so that brightness of black display may be further lowered.

In related art, to improve the contrast, there is a case that another structure obtained by sandwiching a liquid crystal display panel by a pair of polarizers whose transmission axes are orthogonal to each other is prepared and used as a structure for an optical shutter. In this method, however, since one polarizer is disposed to each of both faces of the liquid crystal display panel for an optical shutter, although the brightness in black display may be suppressed only by an amount of the two polarizers, there is a problem such that brightness in white display also largely deteriorates.

On the other hand, in the embodiment, the polarization control element 36 is provided on the back side of the polarizer 20A, and the transmission axis "b" of the polarization control element 36 is set to the direction parallel to the transmission axis "c" of the polarizer 20A in the part corresponding to the pixel position of the intermediate gray level and the high gray level (white display) in the liquid crystal display panel 10 in accordance with the control signal (drive voltage 46a) from the drive circuit 40. At this time, in the polarization control element 36, only the direction of the transmission axis "b" is adjusted at the time of passage through the polarization control element 36, and there is little light loss in the reflection-type polarization element 35. In particular, as shown in FIG. 7A, in the case where the transmission axis "c" of the polarizer 20A is parallel to the transmission axis "a" of the reflection-type polarization element 35 and incident light to the polarization control element 36 is simply passed without turning the polarization axis of the incident light to the polarization control element 36 within the polarization control element 36, there is hardly light loss in the reflection-type polarization element 35. Consequently, light incident on the part corresponding to the pixel position of white display in the polarization control element 36 passes through the polarization control element 36 and the polarizer 20A almost without being attenuated and enters the pixel position of white display in the liquid crystal display panel 10. As a result, decrease in brightness in white display may be suppressed, and brightness in white display which is as high as that of the apparatus in related art having no polarization control element 36 may be obtained.

Therefore, in the embodiment, while suppressing decrease in brightness in white display, contrast may be improved.

In the embodiment, at the time of providing the polarization control element 36 in the illuminating apparatus 30, the type of the illuminating apparatus 30 (for example, the direct backlight type or the side-edge type) is not limited. Consequently, regardless of the type of the illuminating apparatus 30, while suppressing decrease in the brightness in white display, contrast may be improved.

Second Embodiment

Figure 9:
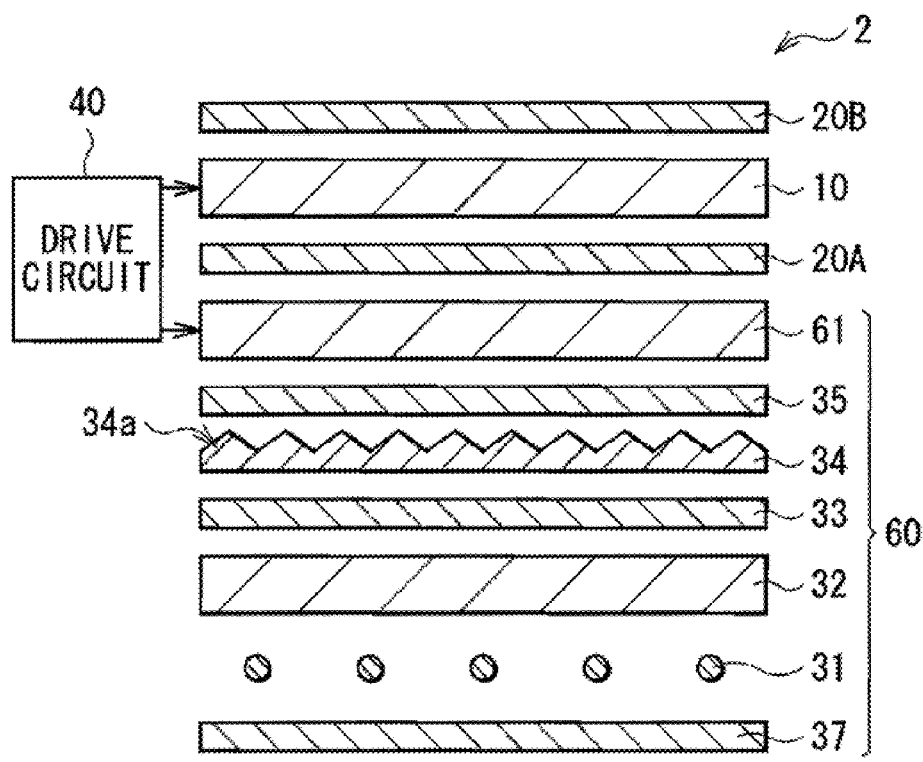
FIG. 9 is a cross section showing an example of the configuration of a display apparatus of a second embodiment.

FIG. 9 shows an example of a schematic configuration of a display apparatus 2 of a second embodiment. The configuration of the display apparatus 2 is different from that of the display apparatus 1 of the foregoing embodiment with respect to the point that an illuminating apparatus 60 having a polarization control element 61 in place of the polarization control element 36 of the foregoing embodiment is provided. In the following, the point different from the foregoing embodiment will be mainly described, and the description on the point common to the foregoing embodiment will not be repeated.

Figure 10:
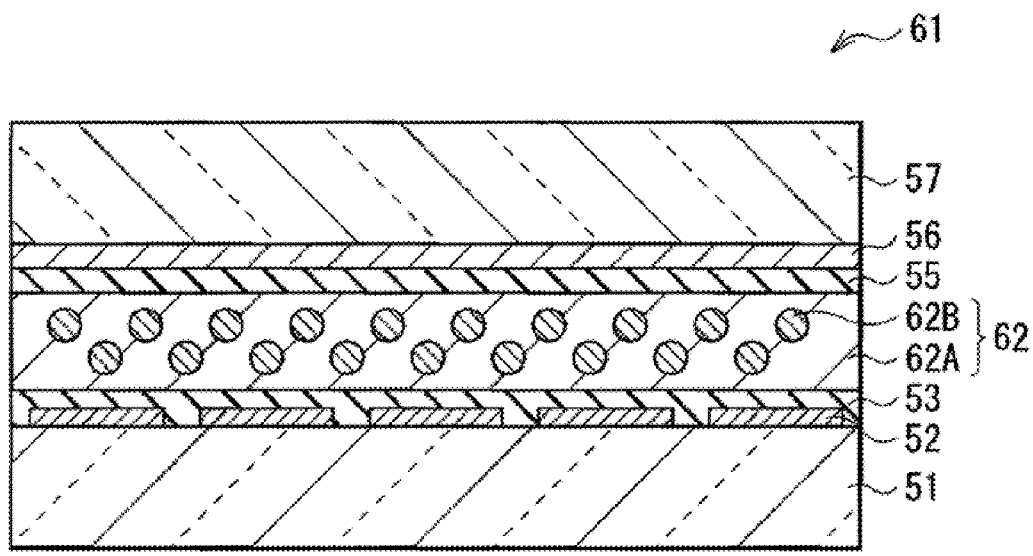
FIG. 10 is a cross section showing an example of the configuration of a polarization control element in FIG. 9.

The polarization control element 61 is provided to suppress black brightness in the black display part included in a video image like the polarization control element 36 in the foregoing embodiment. The polarization control element 61 is, for example, a transmission-type panel in which pixels are driven in accordance with a control signal, and has a structure in which a liquid crystal layer is sandwiched by a pair of transparent substrates. Concretely, the polarization control element 61 has, as shown in FIG. 10, in order from the illuminating apparatus 30 side, the transparent substrate 51, the X electrode 52, the alignment film 53, the liquid crystal layer 62, the alignment film 55, the Y electrode 56, and the transparent substrate 57.

The liquid crystal layer 62 is made of so-called polymer dispersion type liquid crystal. Concretely, the liquid crystal layer 62 is a composite layer including a bulk 62A formed mainly by high polymer and a plurality of particles 62B dispersed in the bulk 62A and mainly made of monomer. The polymer dispersion type liquid crystal may be generated by, for example, injecting a mixture liquid of light-curing or thermal-curing monomer and liquid crystal between two transparent substrates and curing only the monomer by heat application or ultraviolet irradiation. In reality, however, when the polymer dispersion type liquid crystal is formed as described above, there is a case that the particles 62B are formed not completely independent particles but in a network state (sponge state), and that it is difficult to perfectly separate the particles 62B from the bulk 62A.

In the polymer dispersion type liquid crystal, in the case where no voltage is applied, the encapsulated particles 62B are oriented at random (refer to FIG. 11A). Consequently, the refractive indices of the particles 62B do not have anisotropy, and the value of the refractive indices in all directions is higher than the refractive index of the bulk 62A. When light enters the liquid crystal layer 62 at this time, the light is scattered by the interface between the bulk 62A and the particle 62B due to the refractive index difference between the bulk 62A and the particles 62B. In the case where a predetermined voltage is applied, the liquid crystals in the particles 62B are aligned in the voltage application direction (the thickness direction of the liquid crystal layer 62) (refer to FIG. 11B). Consequently, refractive index anisotropy appears in the particles 62B, and the refractive index in the direction parallel to the voltage application direction becomes lower than that in the direction orthogonal to the voltage application direction. In this case where the refractive index in the direction parallel to the voltage application direction and that of the bulk 62A almost coincide with each other at this time, there is no refractive index difference in the interface. Therefore, light entering the liquid crystal layer 62 is not scattered but may transmit the liquid crystal layer 62. As described above, the liquid crystal layer 62 may transmit or scatter incident light (polarization light) in accordance with a control signal (drive voltage 46a).

FIG. 12 shows the relation between application AC voltage Vpp and linear transmittance in the case of using an UMU film manufactured by NSG UMU products Co., Ltd. as a polymer dispersion type liquid crystal. It may be understood from FIG. 12 that by decreasing the application AC voltage Vpp, incident light (polarization light) may be scattered and, by increasing the application AC voltage Vpp, incident light (polarization light) may be passed.

In the embodiment, the X driver 46 performs control to make transmission light of the reflection-type polarization element 35 scattered in a pixel corresponding to the pixel position of low gray level (black display) in the liquid crystal display panel 10 and make the transmission light pass in a part corresponding to the pixel position of intermediate gray level and high gray level (white display) in the liquid crystal display panel 10.

For example, the X driver 46 outputs the control signal (drive voltage 46a) to a pixel corresponding to the pixel position of the intermediate gray level and the high gray level (white display) in the liquid crystal display panel 10 to make the monomers in the particles 62B aligned in the voltage application direction (the thickness direction of the liquid crystal layer 62). The X driver 46 does not output the control signal (drive voltage 46a) to the pixel corresponding to the pixel position of the low gray level (black display) in the liquid crystal display panel 10 to let the liquid crystals in the particles 62B oriented at random. FIG. 13A shows the relations between the on/off operation of the polarization control element 61 and the white display and black display in the liquid crystal display panel 10.

The action and effect of the display apparatus 2 of the embodiment will now be described with reference to FIGS. 14A and 14B. FIGS. 14A and 14B schematically show an example of the polarization state in the display apparatus 2.

Not-polarized light emitted from the light source 31 and passed through the diffuser 32, the diffusion sheet 33, and the prism sheet 34 is incident on the rear face of the reflection-type polarization element 35. A polarization component parallel to the transmission axis "a" of the reflection-type polarization element 35 in the light incident on the rear face of the reflection-type polarization element 35 passes through the reflection-type polarization element 35 and is incident on the rear face of the polarization control element 61. On the other hand, a polarization component crossing the transmission axis "a" of the reflection-type polarization element 35 in the light incident on the rear face of the reflection-type polarization element 35 is reflected by the reflection-type polarization element 35. The reflection light is reflected by the surfaces of the diffuser 32, the diffusion sheet 33, and the prism sheet 34, or the reflection sheet 37, and becomes non-polarized light. The non-polarized light enters again the reflection-type polarization element 35. By repeating such recycle, the light extraction efficiency is increased, and front face brightness improves.

The polarized light incident on the rear side of the polarization control element 61 is controlled by the polarization control element 61 so as to be scattered in a part corresponding to the pixel position of low gray level (black display) in the liquid crystal display panel 10, and so as to be passed in a part corresponding to the pixel position of intermediate gray level and high gray level (white display) in the liquid crystal display panel 10.

For example, in the part corresponding to the pixel position of white display, as shown in FIG. 11B, alignment of liquid crystals in the particles 62B is controlled by the control signal (drive voltage 46a) so that monomers in the particles 62B are aligned along the voltage application direction (the thickness direction of the liquid crystal layer 62). In the part corresponding to the pixel position of black display, as shown in FIG. 11A, the alignment of monomers in the particles 62B is controlled by the control signal (drive voltage 46a) so that the monomers in the particles 62B are oriented at random.

The polarized light passed through the polarization control element 61 enters the polarizer 20A. The polarization component crossing the transmission axis "c" of the polarizer 20A in the light incident on the polarizer 20A is absorbed or reflected by the polarizer 20A, and the polarization component parallel to the transmission axis "c" passes through the polarizer 20A. The light passed through the polarizer 20A is subjected to polarization control in accordance with the magnitude of the applied voltage on the pixel unit basis in the liquid crystal display panel 10. The resultant light is color separated by the color filter 17 and the resultant light is incident on the polarizer 20B. Only a polarization component parallel to the transmission axis "d" of the polarizer 20B passes through the polarizer 20B to form an image on the front face of the panel. In such a manner, an image is displayed in the display apparatus 2.

In related art, incident polarized light passes through the liquid crystal display panel and is absorbed by the polarizer on the outgoing side. Since the polarized light having very high intensity passes through the liquid crystal display panel, the polarization plane is disturbed by depolarization. The amount of light which is not absorbed by the polarizer on the outgoing side but leaks is large, and it is difficult to reduce brightness in the black display.

On the other hand, in the embodiment, the polarization control element 61 is provided on the rear side of the polarizer 20A, and the transmission light of the reflection-type polarization element 35 is scattered in a pixel corresponding to the pixel position of the low gray level (black display) in the liquid crystal display panel 10 or passed in a part corresponding to the pixel position of the intermediate gray level and the high gray level (white display) in the liquid crystal display panel 10. With the arrangement, the light incident on the part corresponding to the pixel position of the black display in the polarization control element 61 is scattered by the polarization control element 61, before entering the polarizer 20A and the liquid crystal display panel 10. As a result, light itself in which the polarization plane is disturbed by depolarization in the liquid crystal display panel 10 may be reduced. Further, light leaked from the part corresponding to the pixel position of black display in the polarization control element 61 is absorbed by the polarizer 20B disposed on the surface side of the liquid crystal display panel 10 (refer to FIG. 14B). Therefore, brightness of black display may be further lowered.

In related art, to improve the contrast, there is a case that another structure obtained by sandwiching a liquid crystal display panel by a pair of polarizers whose transmission axes are orthogonal to each other is prepared and used as a structure for an optical shutter. In this method, however, since one polarizer is disposed on each of both faces of the liquid crystal display panel for an optical shutter, although the brightness in black display may be suppressed only by an amount of the two polarizers, there is a problem such that brightness in white display also largely deteriorates.

On the other hand, in the embodiment, in the case where the polarization control element 36 is provided on the back side of the polarizer 20A, the liquid crystals in the particles 62B are aligned in the voltage application direction (the thickness-direction of the liquid crystal layer 62) in accordance with the control signal (drive voltage 46a) from the drive circuit 40, and the refractive index in the direction parallel to the voltage application direction of the particles 62B and that of the bulk 62A almost match, light entering the liquid crystal layer 62 may pass through the liquid crystal layer 62 without turning the polarization axis. In this case, in the polarization control element 61, only the orientations of monomers in the particles 62B are adjusted at the time of passage through the polarization control element 61, and there is hardly light loss in the reflection-type polarization element 35. Consequently, light incident on the part corresponding to the pixel position of white display in the polarization control element 61 passes through the polarization control element 61 and the polarizer 20A almost without being attenuated and enters the pixel position of white display in the liquid crystal display panel 10. As a result, decrease in brightness in white display may be suppressed, and brightness in white display which is as high as that of the apparatus in related art having no polarization control element 61 may be obtained.

Therefore, in the embodiment while suppressing decrease in brightness in white display, contrast may be improved.

Also in the embodiment, at the time of providing the polarization control element 61 in the illuminating apparatus 30, the type of the illuminating apparatus 30 (for example, the direct backlight type or the side-edge type) is not limited. Consequently, regardless of the type of the illuminating apparatus 30, while suppressing decrease in the brightness in white display, contrast may be improved.

Modifications of First and Second Embodiments

Although the polarization control element 36 is a panel of a simple matrix drive type in the first embodiment, it may be a panel of a static drive type or a TFT drive type. In the static drive, wiring patterns are formed singularly in the vertical direction pixel by pixel and driving is performed without time division.

Figure 15:
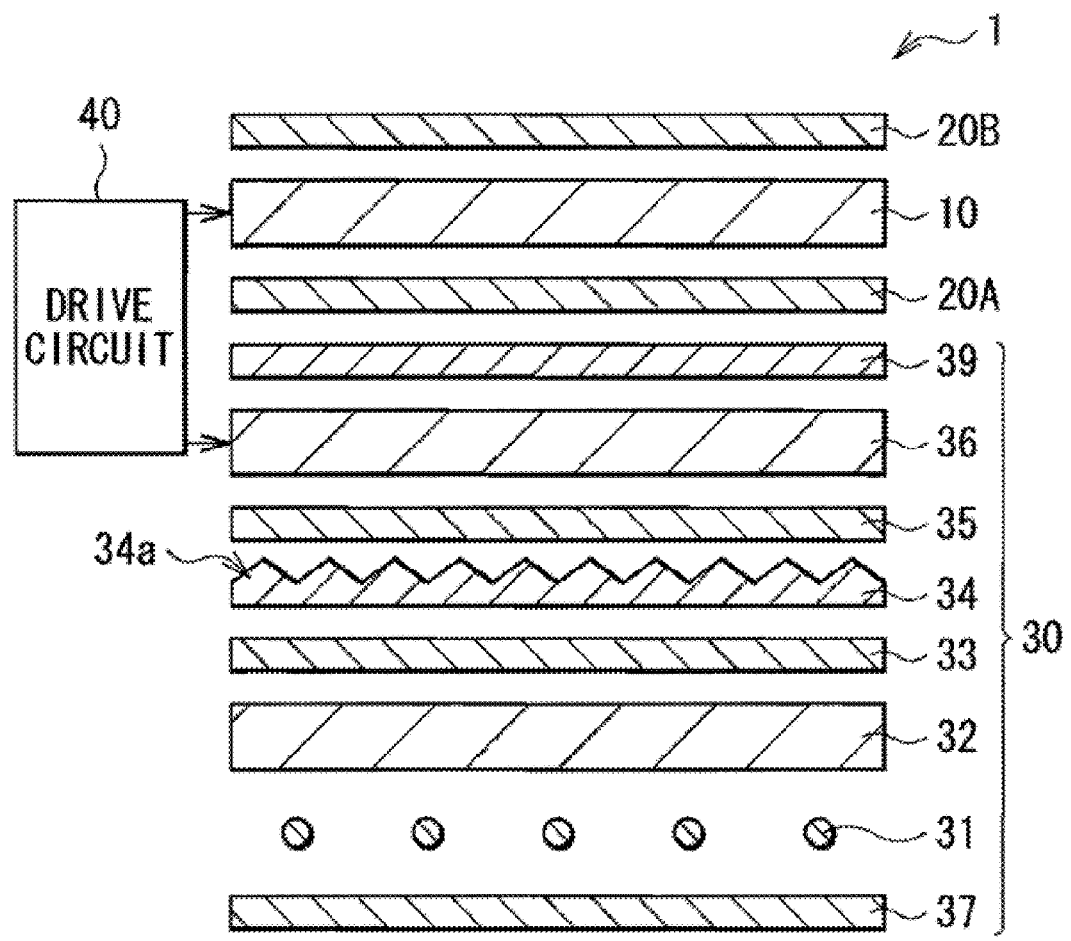
FIG. 15 is a cross section showing another example of the configuration of the display apparatus of FIG. 1.

In the first and second embodiments, in the case where the polarizer 20A is an absorption-type polarization element that absorbs light (polarization light) in a vibration direction other than the transmission axis, it is preferable to provide a reflection-type polarization element 39 having a transmission axis parallel to the transmission axis of the polarizer 20A on the top face of the illuminating apparatus 30 (for example, as shown in FIG. 15, between the polarizer 20A and the polarization control element 36). In this case, the transmission axis of the reflection-type polarization element 39 is, preferably, parallel to the transmission axis of the polarizer 20A. In such a case, the ratio of light absorbed by the polarizer 20A may be reduced, so that the light use efficiency is increased, and front face brightness improves.

Figures 16, 17:
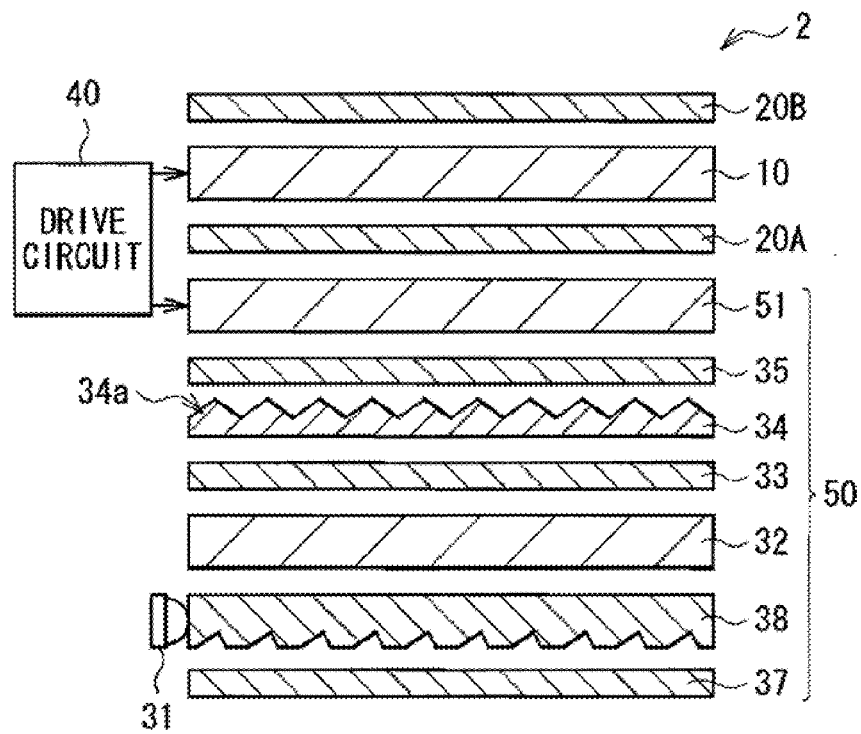
FIG. 16 is a cross section showing another example of the configuration of the display apparatus in FIG. 9.
FIG. 17 is a contrast diagram showing contrast and maximum brightness of display apparatuses of an example and a comparative example.

In the second embodiment, as shown in FIG. 16, the illuminating apparatus 30 may be of the side-edge type using the light guide plate 38.

In the first and second embodiments, the case where the projection 34a in the prism sheet has the shape anisotropy only but does not have the refractive index anisotropy has been described. The projection 34a in the prism sheet 34 may have not only the shape anisotropy but also the refractive index anisotropy. For example, the refractive index in the extension direction of the projections 34a may be smaller than that in the alignment direction of the projections 34a. On the contrary, the refractive index in the alignment direction of the projections 34a may be smaller than that in the extension direction of the projections 34a. Since the direction where the refractive index is small corresponds to the transmission axis of the prism sheet 34, preferably, the prism sheet 34 is disposed so that the transmission axis of the prism sheet 34 becomes parallel to the transmission axis of the reflection-type polarization element 35.

In the case where the projection 34a in the prism sheet 34 has the refractive index anisotropy, the prism sheet 34 may change the transmission characteristic of light incident on the prism sheet 34 in accordance with the polarization state. Therefore, this case is equivalent to a case of providing the prism sheet 34 with the function of the reflection-type polarization element 35, so that the reflection-type polarization element 35 may not be provided. In the case where the reflection-type polarization element 35 is not provided, in the first embodiment, the transmission axis of the polarizer 20A is parallel to the transmission axis of the prism sheet 34 or crosses (is orthogonal to) the transmission axis of the prism sheet 34 in accordance with the configuration of the polarization control element 36.

EXAMPLES

First and second examples of the present application will be described in comparison with first and second comparative examples. A display apparatus of the first example corresponds to a concrete example of the display apparatus 1 of the first embodiment. In a 40-inch liquid crystal television "BRAVIA 2005" manufactured by Sony Corporation (BRAVIA is a registered trademark of Sony Corporation), a 5-inch TN-type liquid crystal panel is mounted as the polarization control element in the center of the screen between a liquid crystal panel and a reflection-type polarization element. In the first example, the transmission axis of the reflection-type polarization element, that of the polarization control element (TN-type liquid crystal panel) when a control signal is not applied, and that of the polarizer on the rear side of the liquid crystal display panel are set parallel to each other. A display apparatus of the second example corresponds to a concrete example of the display apparatus 2 of the second embodiment. In place of the TN-type liquid crystal panel in the display apparatus of the first example, an "UMU film" manufactured by NSG UMU products Co., Ltd. (UMU film is a registered trademark of NSG UMU products Co., Ltd) is mounted as a polarization control element. A display apparatus of the first comparative example is obtained by eliminating the TN-type liquid crystal panel from the display apparatus of the first example. A display apparatus of the second comparative example is obtained by providing two polarizers whose transmission axes are orthogonal to each other on both sides of the TN-type liquid crystal panel in the display apparatus of the first example.

The brightness of the display apparatuses of the first and second examples and the first and second comparative examples, concretely, brightness when white was displayed in the entire screen (white brightness) and brightness when black was displayed in the entire screen (black brightness) were measured by using a spectroradiometer SR-UL1 manufactured by TOPCON Corporation. In FIG. 17, a value obtained by standardizing the white brightness with the black brightness is expressed as contrast, and the white brightness is expressed as maximum brightness. The white brightness in the first example was measured without applying a voltage to the TN-type liquid crystal panel (in this case, the polarization plane is turned by 90° by the TN-type liquid crystal panel). The black brightness of the first example was measured in a state where a large voltage as 30 Vpp was applied so that incident polarization was not turned by 90°. The white brightness of the second example was measured in a state where the voltage Vpp of 40V was applied at the frequency of 1 kHz to an UMU film (registered trademark). The black brightness of the second example was measured in a state where no voltage was applied to an UMU film (registered trademark).

It is understood from the results of the first example and the first comparative example of FIG. 17 that by providing the TN-type liquid crystal panel as the polarization control element between the liquid crystal panel and the reflection-type polarization element and driving it, the contrast may be improved by about 3.8 times as compared with that in the case where the TN-type liquid crystal panel is not provided, and decrease in the maximum brightness may be made to 3% or less.

It is understood from the results of the second example and the first comparative example of FIG. 17 that by providing the UMU film (registered trademark) as the polarization control element between the liquid crystal panel and the reflection-type polarization element and driving it, the contrast may be improved by about twice as compared with that in the case where no UMU film is not provided, and decrease in the maximum brightness may be made to 10% or less.

It is understood from the results of the first and second comparative examples of FIG. 17 that by providing two polarizers whose transmission axes are orthogonal to each other on both sides of the TN-type liquid crystal panel, the contrast may be improved by about seven times as compared with that in the case where the TN-type liquid crystal panel and the two polarizers are not provided, and the maximum brightness drops by about 47%.

For example, in the foregoing embodiments and the like, optical sheets such as the diffuser 32, the diffusion sheet 33, the prism sheet 34, the reflection-type polarization element 35, and the polarization control element 36 are provided in the illuminating apparatus 30. As necessary other optical sheets may be provided. The diffuser 32, the diffusion sheet 33, or the prism sheet 34 may not be provided.

Although the case where the liquid crystal display panel 10 is provided in the display apparatus 1 has been described in the foregoing embodiments and the like, another display panel having a function similar to that of the liquid crystal display panel 10 may be provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus comprising:
a display panel having a plurality of pixels disposed in a matrix, the plurality of pixels being driven on a basic of an image signal;
a first polarizer on one of faces of the display panel;
a second polarizer on the other face of the display panel;
a surface emitting light source illuminating the display panel from a side of the first polarizer;
a third polarizer between the first polarizer and the surface emitting light source;
a polarization control element between the first polarizer and the third polarizer and whose orientation of a transmission axis changes according to a control signal; and
a control section outputting a control signal that controls orientation of the transmission axis of the polarization control element so that a polarization axis of transmission light of the polarization control element is oriented in a direction crossing the transmission axis of the first polarizer in a part corresponding to a pixel position of black display and is oriented in a direction parallel to the transmission axis of the first polarizer in a part corresponding to a pixel position of white display.

2. The display apparatus according to claim 1, wherein the transmission axis of the first polarizer is parallel to the transmission axis of the third polarizer, and
the polarization control element is configured so that when the control signal is not applied, the polarization axis of the transmission light of the polarization control element is parallel to the transmission axis of the first polarizer and, when the control signal is applied, the polarization axis of the transmission light of the polarization control element crosses the transmission axis of the first polarizer.

3. The display apparatus according to claim 1, wherein the transmission axis of the first polarizer crosses the transmission axis of the third polarizer, and
the polarization control element is configured so that when the control signal is not applied, the polarization axis of the transmission light of the polarization control element crosses the transmission axis of the first polarizer and, when the control signal is applied, the polarization axis of the transmission light of the polarization control element is parallel to the transmission axis of the first polarizer.

4. The display apparatus according to claim 1, wherein the third polarizer is a reflection-type polarization element.

5. The display apparatus according to claim 1, wherein the first polarizer is a reflection-type polarization element.

6. The display apparatus according to claim 1, further comprising a reflection-type polarization element between the first polarizer and the polarization control element.

7. The display apparatus according to claim 6, wherein the transmission axis of the reflection-type polarization element is parallel to the transmission axis of the first polarizer.

8. The display apparatus according to claim 1, wherein the polarization control element comprises:

a pair of transparent substrates disposed apart from each other so as to face each other;

a pair of transparent electrodes provided for facing surfaces of the pair of transparent substrates; and a liquid crystal layer in a gap between the pair of transparent substrates.

9. The display apparatus according to claim 8, wherein at least one of the pair of transparent electrodes has a plurality of pixel electrodes disposed in a matrix at a pitch wider than a pixel pitch of the display panel.

10. The display apparatus according to claim 1, wherein the surface emitting light source is of an edge light type.

11. The display apparatus according to claim 1, wherein the surface emitting light source is of a direct backlight type.

* * * * *